Sept. 22, 1959 G. F. QUAYLE 2,904,957
HYDRAULIC DRIVE FOR INDUSTRIAL TRUCK
Filed Aug. 3, 1954 3 Sheets-Sheet 1

INVENTOR.
George F. Quayle
BY
ATTORNEY

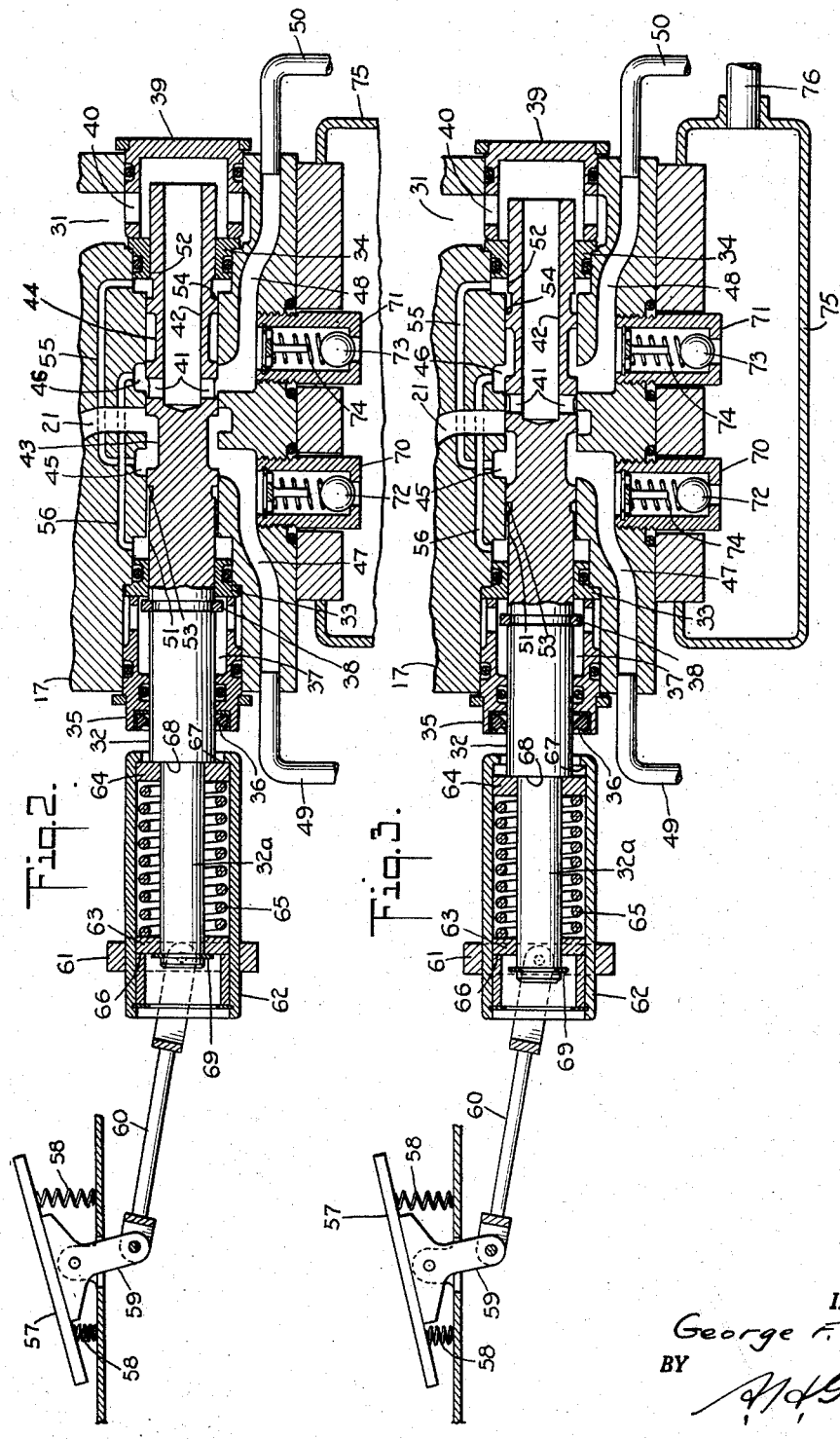

Sept. 22, 1959  G. F. QUAYLE  2,904,957
HYDRAULIC DRIVE FOR INDUSTRIAL TRUCK
Filed Aug. 3, 1954  3 Sheets-Sheet 3

INVENTOR.
George F. Quayle
BY
A. H. Golden
ATTORNEY

United States Patent Office 2,904,957
Patented Sept. 22, 1959

2,904,957

HYDRAULIC DRIVE FOR INDUSTRIAL TRUCK

George F. Quayle, Philadelphia, Pa., assignor to The Yale & Towne Manufacturing Company, Stamford, Conn., a corporation of Connecticut Application August 3, 1954, Serial No. 447,629

8 Claims. (Cl. 60—19)

This invention relates to a hydraulic drive especially adapted for an industrial truck that utilizes an internal combustion engine as the motive power.

More particularly, I contribute by my invention an extremely novel hydraulic drive that enables a truck operator to drive a truck merely through two controls. One of the controls is a standard engine accelerator that will control rather directly the application of power to a hydraulic motor for the truck wheels. The other control is a treadle that will control the direction of truck movement and also the braking of the truck.

Further control will be effected through automatic means that do not require the operator's attention, and the operator need manipulate only the accelerator and treadle. These automatic means will act under conditions of increased load to increase the mechanical advantage of the hydraulic drive, while the accelerator continues in control of the power applied to the motor. If the load increases beyond a predetermined point, as when the truck comes to a very steep grade, the automatic means will act independently of the accelerator and treadle to reduce the power, thus preventing overloading of the truck engine.

In addition, my hydraulic drive will effect braking of the truck when the operator moves the treadle to a neutral position, but will automatically control the braking action to prevent actual locking of the truck wheels.

As a feature of my invention, I utilize the treadle to control a valve that directs to the motor the fluid from pumping means driven by the internal combustion engine. This valve has means whereby the fluid pressure that is developed between the pumping means and the motor tends always to move the valve to a neutral position. As a further particular feature of this invention, the valve is moved manually through the medium of a spring or other energy-storing means and is held in controlled position through said spring or means. Therefore, the pressure developed in the system will operate against the spring or energy-storing means regardless of the will of the operator. Through this arrangement there is an automatic control of the hydraulic drive that is exceedingly important and makes possible a number of contributions of value in this art.

As a further feature of the invention, the valve may be moved to cut communication between the motor and the hydraulic system in order to brake the truck, it being obvious that with the fluid not flowing from the motor, the motor cannot move. Under such conditions, great pressures can develop and lead to great damage. Such damage is prevented because the pressure developed in the system through the valve acts to move the valve to allow a flow of fluid. Therefore, it becomes impossible for the operator to shut communication completely during movement of the truck and only a controlled braking can result.

As a still further feature of my invention, means are provided for admitting a greater quantity of fluid into the motor than is being supplied to the motor from the pumps that form the source of hydraulic pressure. Therefore, it is possible for the motor to move at a faster rate than that determined by the flow of fluid, as when the truck is moving down hill.

I contribute a further feature by my invention through the provision of means for decreasing the volume of fluid supplied to the motor, when the fluid pressure increases beyond a predetermined degree. Therefore, I obtain the same general results that are obtained through the utilization of gear shift means in a conventional drive. Thus, through utilization of a source of fluid pressure, such as two pumps, with one of the pumps being shut off from communication with the motor when the pressure reaches a predetermined degree, only one pump then drives the motor. Since in my invention I utilize an internal combustion engine to drive the two pumps of the fluid pressure source, the elimination of one of the pumps naturally decreases the load being carried by the engine so that the engine is able to operate the remaining pump at higher pressure to move the truck on steep grades.

As a further feature of this part of the invention, I prefer so to construct the hydraulic system that the engine drives both pumps until the engine reaches its load capacity, and then drives merely one pump until it again reaches its load capacity. This I accomplish by utilizing two pumps of equal capacity, with the control valve constructed to act when the fluid pressure rises to a point that is one half the pressure that effects yielding of the spring between the treadle and the movable valve.

I have thus outlined rather broadly the more important features of my invention in order that the detailed description thereof that follows may be better understood, and in order that my contribution to the art may be better appreciated. There are, of course, additional features of my invention that will be described hereinafter, and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Referring now to the drawings:

Fig. 2 shows a part of Fig. 1 with the movable valve in position for driving in a particular direction.

Fig. 3 is similar to Fig. 2, showing the movable valve in overload position.

Figure 1:
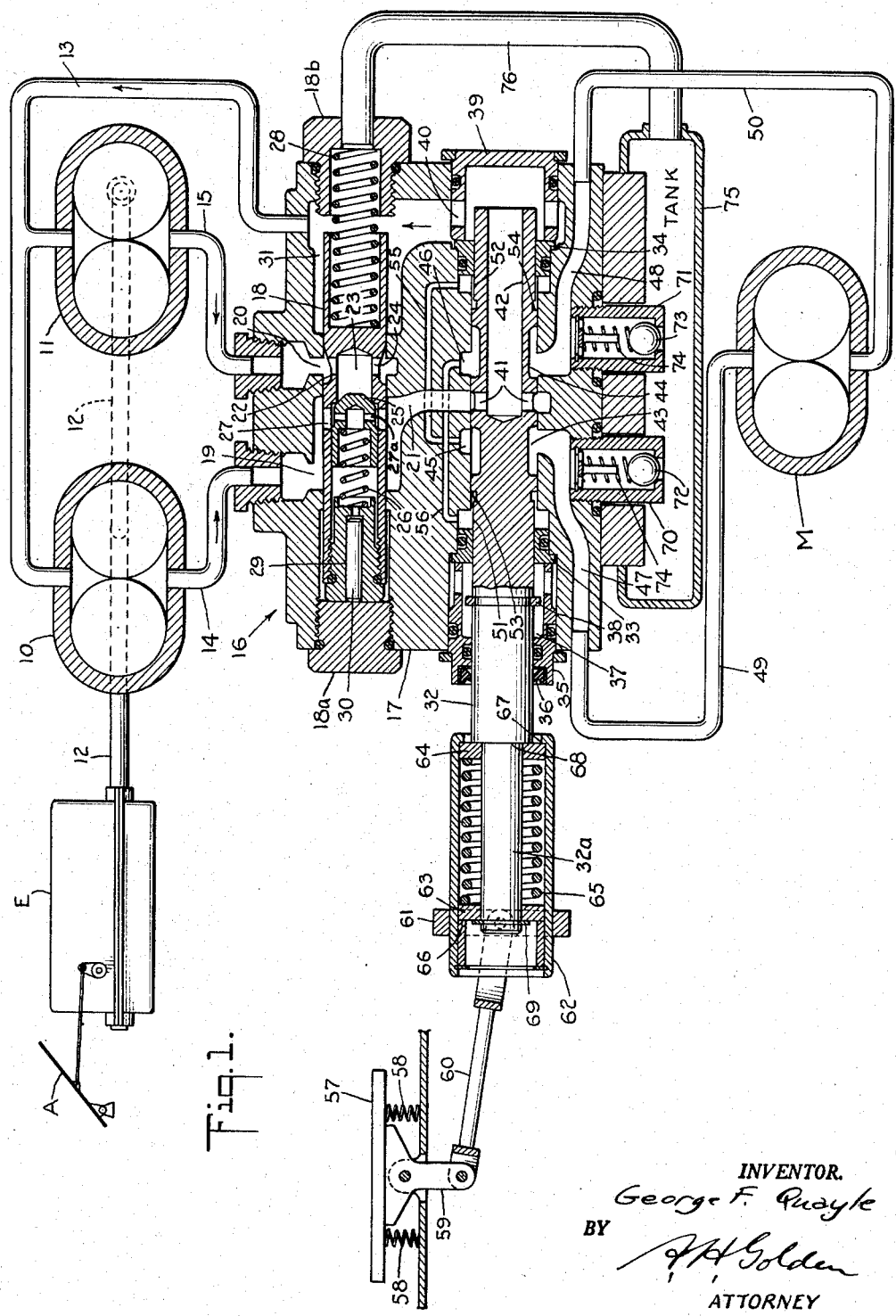
Fig. 1 shows my novel hydraulic drive system diagrammatically in longitudinal section.

Referring now particularly to Fig. 1, my novel hydraulic drive includes a pair of fluid pumps 10, 11 that provide fluid pressure for driving a hydraulic motor M. This motor M is of any commercial type with constant displacement, and drives the wheels of the industrial truck, not shown. I utilize a truck engine E to drive pumps 10, 11 simultaneously through common means that I show diagrammatically as a shaft 12. For reasons that will appear, I utilize pumps 10, 11 that are equal in capacity and power, and I connect these pumps in parallel through a common hydraulic intake line 13 and individual discharge lines 14, 15.

I control the fluid discharge from the lines 14, 15 through extremely novel valve means that I indicate generally by the numeral 16, these valve means being formed preferably with an integral cast body 17. In a horizontal bore in the upper part of the valve body 17, as shown in Fig. 1, I mount a control valve shaft 18 for longitudinal sliding movement. Shaft 18 is entirely within the valve body 17, but for manufacturing purposes I form the horizontal bore entirely through the valve body with closure plugs 18a, 18b at its opposed ends. The hydraulic line 14 from pump 10 is connected to the valve body 17 and communicates with an intermediate portion of control valve shaft 18 through a passage 19 in the valve body, while line 15 from pump 11 communicates with another portion of shaft 18 through a passage 20. Passage 19 is enlarged relatively to shaft 18 whereby the fluid in this passage can flow around the shaft, and downwardly through a passage 21 to a movable valve later to be described. Thereby, the fluid pressure developed by pump 10 is directed to this movable valve independently of the position of control valve shaft 18.

I utilize the pressure in passages 19, 21 to control the fluid that is pumped by pump 11. For this purpose, I form the control valve shaft 18 with a relatively wide peripheral groove 22 that is normally aligned with passage 20 that leads from pump 11. The left hand portion of valve shaft 18 has an axial passage 23 that communicates with groove 22 through ports 24, and this axial passage 23 has within it a sliding check valve 25. A very light coil spring 26 presses check valve 25 toward the right in passage 23 to a position closing the passage, and spring 26 by yielding allows check valve 25 to move to the left, this movement allowing fluid from pump 11 to flow from ports 24 past the check valve and into passage 19 through ports 27 in the sides of the shaft 18. In other words, because the spring 26 that presses the check valve is rather light, and offers practically no resistance to the flow of fluid from pump 11, the fluid flow from pump 11 is added to the flow from pump 10 so that both pumps normally supply fluid to the passage 21.

A coil spring 28 is engaged between the valve body 17 and the right hand end of control valve shaft 18, as viewed in Fig. 1, and normally presses the shaft 18 toward the left, the position in Fig. 1 being the normal position of the valve. I further construct the control valve in such a way that the fluid in passage 19 will move shaft 18 toward the right in opposition to spring 28 upon its reaching a predetermined pressure greater than that of spring 28. Thus, I apply the pressure in passage 19 to the left hand outer end surface of the shaft 18 through ports 27, further ports 27a in check valve 25, and an axial passage 29 in the shaft.

Figure 5:
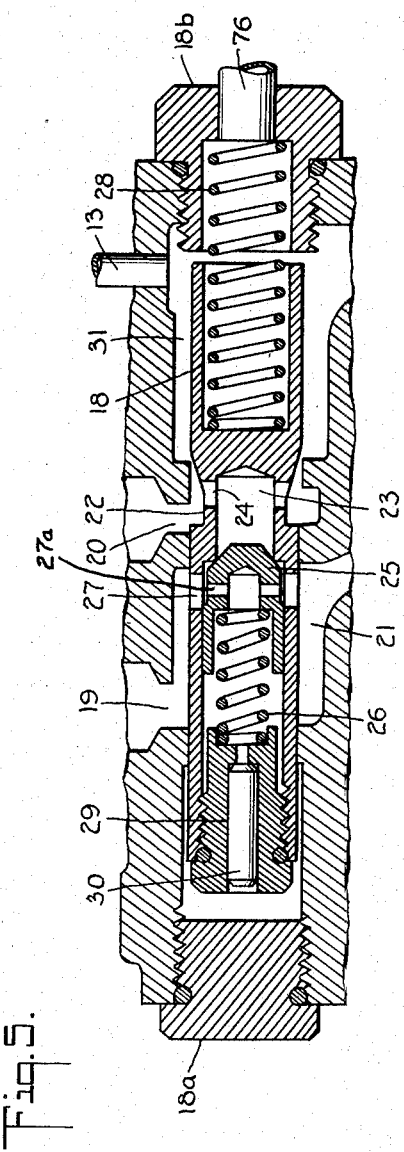
Fig. 5 shows the low speed position of the control valve.

I equip the axial passage 29 with means for metering the flow of fluid through the passage, and thereby prevent too fast an operation of the valve, and I prefer to utilize for this purpose a rod 30 having a rather close fit within passage 29. Through this construction, the fluid pressure in passage 19, when rising to a predetermined point, is effective against the left hand end of control shaft 18 to move the shaft toward the right. This movement of the shaft brings the peripheral groove 22 into the position shown in Fig. 5, to provide communication between passage 20 and a chamber 31 in the right hand side of valve body 17. This chamber is in direct communication with the pump intake line 13 and the reservoir 75, through pipe 76. Therefore, pump 11 merely idles. In this idling no-load condition of pump 11, the pressure in passage 20 is relieved and thereby the check valve 25 closes passage 23 to prevent an escape of fluid pressure from passage 19.

If the fluid pressure in passages 19 and 21 should later drop, spring 28 will move control shaft 18 to the left as shown in Fig. 1, thereby causing the fluid from pump 11 again to open check valve 25 and to flow into passage 21. Through the construction that I have thus far described, I enable the truck engine E under heavy load to act merely through one pump 10 to supply fluid at decreased volume but increased pressure to the driving motor M, giving the same effect as a gear shift in a conventional gear drive. This particular action will be further explained in due course, but I shall describe first the structure through which I control the driving, braking and coasting action of my novel hydraulic drive.

In the lower part of the valve body 17, I mount a movable valve shaft 32. This valve shaft 32 extends outwardly from the valve body 17 at its left hand end, as viewed in Fig. 1, and slides in circular bearing members 33, 34 in the valve body. A sleeve 35 encircles shaft 32, and a packing 36 prevents the escape of fluid around the shaft. Sleeve 35 also is formed with a chamber 37 in which a ring 38 on shaft 32 moves, this ring limiting the sliding movement of the shaft through engagement with opposed ends of the chamber 37. A cup-shaped member 39 closes the chamber 31, this member having a port 40 through which the right hand end of shaft 32 is in communication with the chamber 31.

In a neutral position of movable valve shaft 32, seen in Fig. 1, ports 41 in the shaft are aligned with the passage 21 that leads from pumps 10 and 11. These ports 41 communicate with an axial bore 42 extending through the right hand end of shaft 32, whereby this shaft when in neutral position proves communication between passage 21, chamber 31, and pipe 76 to tank 75. In this position of the valve, all of the fluid that is discharged from both pumps 10 and 11 is recirculated through the intake passage 13 of the pumps so that these pumps rotate with no load. At opposed sides of ports 41, movable shaft 32 is formed with relatively wide peripheral grooves 43, 44. Further, the valve body 17 is formed internally with circular grooves 45, 46 with which grooves 43, 44 in the shaft are adapted to align, but that are somewhat narrower than grooves 43, 44. Passages 47, 48 in the valve body 17 extend from the grooves 45, 46 toward the motor M. When movable valve shaft 32 is shifted toward the right from the position shown in Fig. 1, to the position shown in Fig. 2, groove 43 establishes communication between passage 21 and passage 47 in the valve body. Simultaneously, ports 41 in shaft 32 move into alignment with groove 46. This places passage 48 in communication through axial passage 42 of the valve shaft with the chamber 31 in the valve body and the tank 75. A hydraulic line 49 leads from passage 47 to one side of the hydraulic motor M, while a line 50 leads from the other side of motor M to passage 48. Thus, when movable valve shaft 32 is shifted toward the right, the fluid pressure developed by the pumps 10, 11 is applied through passages 21 and 47 and line 49 to the hydraulic motor M, with the fluid discharged from this motor moving through line 50 and passages 48 and 42 and to chamber 31 to the low pressure side of the hydraulic system. When the valve shaft 32 moves away from neutral in the opposed direction, the passage 21 is, of course, in communication with the passage 48 while the axial passage 42 of the shaft is in communication with the passage 47, so that the fluid moves in the opposed direction through the motor M and the motor is reversed.

I shall now describe the particular arrangement through which the movable valve shaft 32 is moved to direct the operation of the truck, and the means whereby it is automatically controlled. Each end of the movable valve shaft 32 has portions 51, 52 of a reduced diameter. At inner ends of these reduced portions 51, 52 are shoulders 53, 54 facing the ends of the shaft. In the valve body 17, as seen in Fig. 1, I form a passage 55 that leads from the circular groove 45 to a point to the right of the reduced shaft portion 52, whereby pressure in groove 45 is applied to shoulder 54. I similarly form the valve body with a passage 56 leading from groove 46 to a point to the left of shoulder 53, whereby pressure in groove 46 is applied to the shoulder 53. The effect of this arrangement will be best understood when considering together Figs. 2 and 3.

Let us now assume that the truck is being driven in a particular direction with movable valve shaft 32 held in the position shown in Fig. 2 by means to be set forth presently. Now, as the driving load increases toward an overload point, the increasing resistance to rotation of the motor M will cause the fluid pressure in passage 47 and hydraulic line 49 to increase. This pressure will be transferred through groove 45 and passage 55 against shoulder 54 and will tend to move valve shaft 32 toward the left to a neutral position. If valve 32 is oppositely positioned to drive in a reverse direction, passage 56 will be effective to press the valve to the right to a neutral position. In other words, the driving pressure developed in the system tends always to move valve 32 to neutral non-driving position. For yieldingly operating valve 32 I use a foot treadle 57. This treadle 57 is shown in Fig. 1 in neutral position, and can move in opposed directions from neutral to direct the truck forwardly and rearwardly. Preferably treadle 57 is equipped with springs 58 that tend to hold the treadle in neutral. Treadle 57 has an arm 59 upon which is pivoted a link 60, this link being pivotally connected also to a flange 61 on a tubular sleeve 62 that encircles the reduced outer end portion 32a of movable valve shaft 32. Slidable within the sleeve 62, and also slidable on shaft portion 32a, are two washers 63, 64, with a coil spring 65 engaged between these washers. One washer 63 is pressed by spring 65 against a shoulder 66 within guide sleeve 62, while spring 65 presses washer 64 against a shoulder 67 at the opposed end of the sleeve. Both washers 63, 64 are retained on the outer end portion 32a of shaft 32 between a shoulder 68 on the shaft and a snap ring 69. This arrangement provides a yielding connection between the foot treadle 57 and the valve shaft 32 whereby the truck driver may move the shaft 32 in either direction for driving the truck in either direction. In one direction sleeve 62 moves the washer 64 to compress spring 65 which reacts against washer 63 and snap ring 69 to move shaft 32 to the left. In the opposed direction sleeve 62 acts on washer 63 through shoulder 66 to press spring 65 against washer 64. Washer 64 naturally moves the shaft 32 to the right.

It is extremely important to note that the spring 65 can yield to enable the valve shaft 32 to move toward neutral position, without regard to the position in which treadle 57 is held by the driver. If the driver attempts to hold the valve shaft 32 in driving position when an overload occurs, the fluid pressure will nevertheless move shaft 32 toward neutral by overcoming spring 65. Thus, if we assume that the valve shaft 32 is held by the treadle 57 in the driving position shown in Fig. 2, and if we assume that the fluid pressure increases toward an overload point, this pressure will act through passage 55 against shoulder 54 to move shaft 32 toward the left to the position shown in Fig. 3, with the spring 65 between the treadle and shaft yielding to permit this movement, and with the treadle remaining in its position of Fig. 2.

The extremely novel construction that I have described acts also under the control of the foot treadle 57 to brake the truck. It will be observed that when the movable valve shaft 32 is in the neutral position shown in Fig. 1, this valve shaft blocks any discharge of fluid from the motor M. To apply a braking action, therefore, it is merely necessary for the truck driver to move the valve shaft 32 toward neutral position through the treadle 57, to the extent that will provide the desired degree of braking. In operation, however, it is impossible to block the motor M against rotation, since were the motor to be blocked, the high pressures would probably cause great damage.

This will best be understood if we assume that the valve shaft 32 is first in the driving position shown in Fig. 2, and the operator then moves the shaft swiftly toward the left to brake the truck. This movement will tend to bring the parts to the position of Fig. 1. With motor M still turning, the pressure in passage 50 will be very great and will act through 46 and passage 56 against the shoulder 53 on the valve shaft 32 to move the valve shaft away from neutral position. Since the only force moving the shaft toward neutral is applied through the spring 65 by the foot treadle 57, a point is reached at which the discharge of fluid from the motor is not further reduced and it is at this point that the maximum possible braking action occurs. Because the operator acts on valve 32 only through spring 65, it is not possible for the truck driver to increase the braking action beyond this predetermined limit. Thus, it may be said that the strength of the spring 65 determines the maximum braking pressure that can be applied, as well as the maximum power that can be applied to drive the hydraulic motor M. It may be noted at this point that the treadle springs 58, by pressing the treadle 57 to neutral position, tend to move valve shaft 32 to position for braking the truck whether or not the truck driver actuates the treadle for this purpose. This provides what is in effect a "dead man" control for the truck.

To utilize to best advantage the power developed by the truck engine E, I prefer so to construct the spring 65 that its effective strength is twice the effective strength of the control valve spring 28. In other words, the pressure of spring 28 is such that the control valve 18 automatically bypasses the pump 11 at one half the pressure that is necessary to effect yielding of the spring 65 between the treadle 57 and movable valve 32. Through this arrangement, I enable the engine E first to drive both pumps 10, 11 until the engine reaches its load capacity. Through the action of the control valve 18, the pump 11 is then bypassed and the engine E operates through the pump 10 alone until the engine again reaches its load capacity, at which time spring 65 yields to relieve the pressure in the system. I have already stated that the pumps 10 and 11 preferably are equal in capacity, and therefore the bypassing of pump 11 in effect doubles the mechanical advantage of the engine E relatively to motor M. Since control valve 18 acts at one-half the pressure necessary to actuate movable valve 32, I obtain automatically the most efficient utilization of power, while preventing overloading of the engine at maximum power.

I further equip my novel hydraulic drive with valve means that act automatically to allow the hydraulic motor M to rotate more rapidly than it is being driven, thereby allowing the truck to coast. For the particular purpose, I mount upon the lower side of the valve body 17, a pair of tubular supports 70, 71 for a pair of ball check valves 72, 73. The valve supports 70, 71 are individually in communication with the passages 47, 48 in the valve body 17, with the balls 72, 73 so arranged that pressure in these passages holds the valves in closed position. I equip each valve with a spring 74 that tends to close the valve, but these springs are relatively light and offer very little resistance to opening of the valve. Valves 72, 73 are in direct communication with reservoir tank 75 of the hydraulic system with the lower ends of the check valves extending into the fluid in the reservoir 75. Hydraulic line 76, as was earlier noted, connects the reservoir 75 with the low pressure chamber 31 in the valve body 17. During coasting of the truck, the motor M tends to rotate faster and with greater fluid flow therethrough than the hydraulic pumps 10, 11 can supply. This, naturally, creates a partial vacuum in one of the passages 47, 48, and the corresponding ball valve 72 or 73 then opens, as in Fig. 4, to supply the particular passage with fluid. This fluid will move through the motor M, passage 50, valve shaft 32, chamber 31 and line 76 to reservoir tank 75.

It will probably be helpful to a complete understanding of the invention if the operation of the structure is reviewed, presenting just what happens during the operation of the hydraulic system in the movement of a truck under various drive conditions.

Let us say that the hydraulic drive is in the position of Figure 1 and that it is desired to drive the truck forwardly. The operator depresses the accelerator pedal A bringing the engine E to speed. He then steps on the treadle 57, moving it against the pressure of one of the springs 58, as in Figure 2, and thereby moving the valve shaft 32 into a position where the passage 21 is in communication with the motor M through passage 47 and hydraulic line 49. At the time, both pumps 10 and 11 are supplying fluid under pressure, it being assumed that the truck is on level ground. Fluid will flow back from the motor through line 50, passage 48, ports 41 into the chamber 31, all as is well illustrated in Fig. 2, taken in connection with Fig. 1.

As the pressure developed in the hydraulic drive increases due to resistance encountered by the truck in moving up a grade as an example, there is an increase of pressure within the passage 47 and groove 45. This pressure within the groove 45 will act through passage 55 and against shoulder 54 in Fig. 2 to urge the valve shaft 32 toward the left in Fig. 2 and back toward the position of Fig. 1. In other words, there is always a tendency for the pressure developed by the pumps and the motor urging the valve shaft into neutral position. The valve shaft is of course maintained away from neutral position by the treadle 57. However, the treadle 57 holds the shaft 32 in any selected position through the intermediary of spring 65. Therefore, the development of extremely high pressure will act to return the valve shaft 32 to neutral position against the pressure of the spring 65 and against the will of the operator. In other words, the operator can only urge the valve to a particular speed position with the pressure in the system moving the valve out of the speed position and toward neutral as the load increases.

Figure 4:
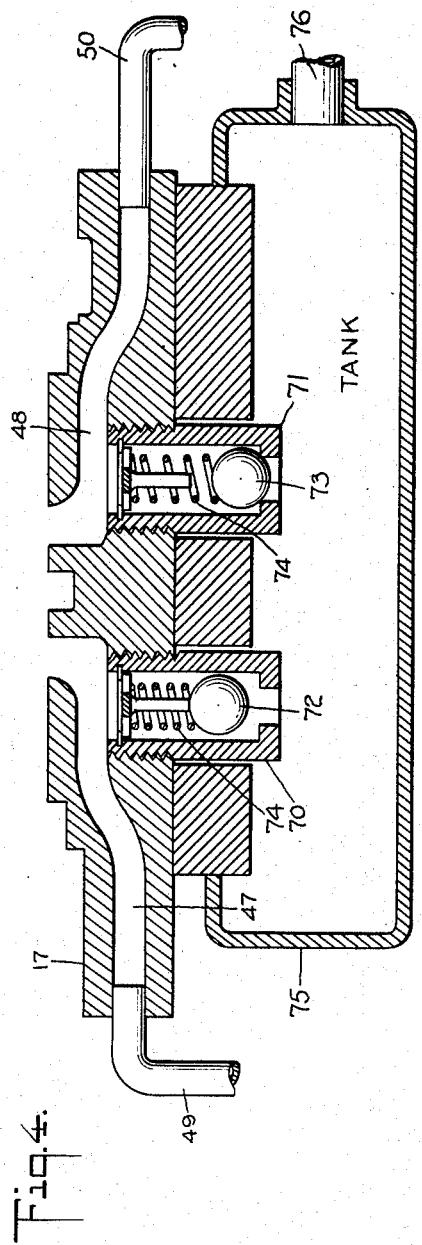
Fig. 4 shows a part of Fig. 2, but with a ball valve in coasting position.

Let us now assume that the parts of my system are in the position of Fig. 2 and the truck is moving rapidly down hill. The two pumps are of course being driven at a particular speed under the control of accelerator pedal A through the operation of engine E. Because the wheels of the truck are moving faster than they are urged by the motor M, the motor M tends to rotate at a speed greater than that to which it is urged by the pumped fluid. To allow the motor M to rotate at this greater speed I utilize the two valves 72 and 73, one valve functioning when the motor rotates in one direction and the other valve functioning when the motor rotates in the reverse direction. Let us assume that the motor is rotating in that direction for which it is set in Fig. 2 and that the motor therefore requires the flow of more fluid through passage 47 than it receives from the pumps. It will be allowed to receive this additional fluid because the ball valve 72 will be unseated as shown in Fig. 4, and fluid will flow into the passage 47 not only from the pumps but from the tank 75.

With the truck moving in the particular direction determined by the setting of the parts in Fig. 2, let us say that the operator wishes to stop the truck. He then returns the treadle from its position of Fig. 2 to its position of Fig. 1. It is obvious now that fluid flowing from the motor and moving through hydraulic line 50 and passage 48 will be stopped at groove 44 and will not have an open passage to the low pressure side of the system and tank 75. With the truck moving at a fairly rapid speed, such action on the part of the operator develops such extreme pressures that the whole system would probably be either damaged or destroyed. To prevent such action, the development of high pressure within the passage 48 will act through groove 46 and passage 56 against the shoulder 53 of the valve shaft 32. Therefore, valve shaft 32 will move to the right simply through compressing the spring 65, as is clearly apparent in Fig. 3. This movement to the right will bring the ports 41 from the position of Fig. 1 toward that of Fig. 3 and then opposite passage 48, which is the position of the parts in Fig. 2. The fluid in the motor will now empty into the low pressure side of the system. Of course, the operator is still maintaining the treadle 57 in its neutral position and there will be a tendency for the valve shaft 32 to move toward its fully closed and full braking position, and it will so move gradually as the pressure in passage 48 decreases due to the slowing down and final stopping of the truck.

Let us now assume that the truck is moving up a very steep grade with both pumps 10 and 11 supplying the fluid. As soon as the pressure being developed by the two pumps 10 and 11 is greater than that predetermined by the setting of spring 28, the entire control valve shaft 18 will move to the right because fluid has flowed through the metered passageway 29 past the pin 30 to the end of the valve shaft 18. The movement of the valve shaft to the right will be that illustrated in Fig. 5 where it is obvious that the passage 20 leading from pump 11 is in communication with the low pressure chamber 31 and tank 75. At the same time, the pump 10 remains in communication with passage 21 and therefore is in supply communication with motor M. It is obvious that the amount of fluid now moving through passage 21 is exactly half the fluid moving when both pumps 10 and 11 are in operation. The pressure will of course be that which is sufficient to drive the motor M and to hold the control valve in the position of Fig. 5. The engine E is now driving only one pump instead of two and is supplying only one-half the fluid, although the pressure is higher. Naturally therefore, the truck is now being driven at a lower speed, and with the engine E operating under a partial load only. In effect, we have had the equivalent of a downward shifting of the gears of the usually driven mechanical truck.

I believe that those skilled in the art will now understand the construction and operation of my novel hydraulic drive. Through the features of my drive, I enable the truck driver to control the driving, braking, and coasting of the truck through extremely simple controls, while preventing overloading of the system or the engine of the truck. Moreover, through automatic action of my hydraulic drive, I am able to obtain extremely efficient utilization of the engine power. I believe, therefore, that the very considerable value of my invention will be fully appreciated.

I now claim:

1. In a combination of the class described, pumping means, an engine for driving said pumping means, a hydraulic motor actuated by the fluid pressure developed by said pumping means, a movable valve, manual control means, spring means between said manual control means and said valve through the intermediary of which said manual means moves said valve from a neutral position into drive position for directing the fluid from said pumping means to said motor, means whereby the fluid pressure developed by said pumping means when the valve is in drive position is applied to said valve to move it against the pressure of said spring means toward neutral position, means directing to the valve the fluid discharge pressure developed by rotation of said motor, and means whereby the pressure so directed acts when the valve is in neutral position for pressing said valve from its neutral position toward drive position.

2. In a combination of the class described, pumping means, an engine for driving said pumping means, a hydraulic motor actuated by the fluid pressure developed by said pumping means, a movable valve, manual control means, spring means between said manual control means and said valve through the intermediary of which said manual means moves said valve from a central neutral position into drive positions at each side of said neutral position for directing the fluid from said pumping means to one side or the other of said motor, means whereby the fluid pressure developed by said pumping means when the valve is in either of said drive positions is applied to said valve to move it against the pressure of said spring means toward neutral position, and means whereby the fluid pressure developed by rotation of said motor in either direction when the valve is in neutral position presses said valve from neutral position toward a drive position.

3. In a combination of the class described, pumping means, an engine for driving said pumping means, a hydraulic motor actuated by the fluid pressure developed by said pumping means, a movable valve, manual control means, spring means between said manual control means and said valve through the intermediary of which said manual means moves said valve from a central neutral position into drive positions at each side of said neutral position for directing the fluid from said pumping means to one side or the other of said motor, and passages between said motor and valve whereby the fluid pressure developed by said pumping means when the valve is in either of said drive positions is applied to said valve to move it against the pressure of said spring means toward neutral position, and whereby the fluid pressure developed by rotation of said motor in either direction when the valve is in neutral position presses said valve from neutral position toward a drive position.

4. In a combination of the class described, pumping means, a hydraulic motor actuated by the fluid pressure developed by said pumping means, a movable valve acting when in a neutral position to bypass said motor with the fluid pressure discharged through said valve, passage means whereby the valve when in a drive position directs the fluid pressure to one side of the motor and discharges fluid from the other side of the motor, said movable valve when bypassing the motor closing said passage means whereby to oppose rotation of the motor, and means through which fluid pressure developed at the discharge side of the motor acts on said movable valve to press said valve away from neutral position whereby to prevent a too severe braking action of the motor.

5. In a combination of the class described, pumping means, a hydraulic motor actuated by the fluid pressure developed by said pumping means, a movable valve acting when in a neutral position to bypass said motor with the fluid pressure discharged through said valve, passage means whereby the valve when in a drive position directs the fluid pressure to one side of the motor and discharges fluid from the other side of the motor, means through which the fluid pressure at the pressure side of the motor acts on said movable valve to press the valve toward bypassing position whereby to prevent overloading of said engine and motor, said movable valve when bypassing the motor closing said passage means whereby to oppose rotation of the motor, and means through which fluid pressure developed at the discharge side of the motor presses said movable valve away from bypassing position whereby to prevent a too severe braking action of the motor.

6. In a combination of the class described, pumping means, a hydraulic motor actuated by the fluid pressure developed by said pumping means, a movable valve acting when in a neutral position to bypass said motor with the fluid pressure discharged through said valve, passage means whereby the valve when in a drive position directs the fluid pressure to one side of the motor and discharges fluid from the other side of the motor, said movable valve when in neutral position closing said passage means whereby to apply a braking action to the motor, means responsive to pressure developed by said pumping means to press the movable valve toward neutral position and also responsive to pressure developed by the motor to press the valve away from neutral position, a manual control for said valve, and yielding means between the manual control and the valve enabling the valve to move independently of the manual control whereby to limit the driving and braking action of the motor.

7. In a combination of the class described, an internal combustion engine equipped with an accelerator that controls the power output of said engine, a pair of pumps, means through which the internal combustion engine drives both said pumps, a hydraulic motor, passage means for directing to said motor the fluid pressure developed by both said pumps whereby the fluid drives said motor, said accelerator effective through control of the fluid pressure to control the power applied to said motor, valve means acting when the fluid reaches a predetermined pressure to discharge the fluid output of one of said pumps, and a check valve responsive to the discharge of the output of said one pump to close communication between said one pump and the motor whereby to reduce the motor speed while the accelerator continues to control the power applied to the hydraulic motor.

8. In a combination of the class described, a hydraulic motor, a pair of pumps to provide fluid pressure for said motor, an internal combustion engine driving both of said pumps simultaneously, an accelerator controlling the power output of said internal combustion engine, passage means directing fluid pressure from one pump toward said motor, a control valve acting in a normal position to direct fluid pressure from the second pump to said passage means whereby the engine power is divided between both pumps for driving the motor, said accelerator effective through control of the fluid pressure to control the power applied to the motor, means whereby predetermined pressure in said passage means moves the control valve to a bypassing position, a passage through which the valve when in bypassing position discharges the fluid pressure from the second pump, a check valve responsive to said discharge of pressure to close communication between the second pump and said passage means that direct pressure toward the motor whereby all of the engine power is applied through the first pump to the motor, and the engine power when so applied driving the motor at reduced speed.

References Cited in the file of this patent

UNITED STATES PATENTS

| | | |
|---|---|---|
| 1,198,093 | Williams | Sept. 12, 1916 |
| 1,982,711 | Vickers | Dec. 4, 1934 |
| 2,030,257 | Hume | Feb. 11, 1936 |
| 2,074,618 | Roeder | Mar. 23, 1937 |
| 2,243,364 | Trautman | May 27, 1941 |
| 2,275,321 | Scates | Mar. 3, 1942 |
| 2,354,562 | Webb | July 25, 1944 |